US012807332B2

(12) United States Patent
Rahman

(10) Patent No.: US 12,807,332 B2
(45) Date of Patent: Nov. 24, 2026

(54) SYSTEM AND METHOD FOR VALIDATING AIRCRAFT PROPULSION SYSTEM PARTS

(71) Applicant: Pratt & Whitney Canada Corp., Longueuil (CA)

(72) Inventor: Md Mizanur Rahman, Saint-Hubert (CA)

(73) Assignee: Pratt & Whitney Canada Corp., Longueuil (CA)

( * ) Notice: Subject to any disclaimer, the term of this patent is extended or adjusted under 35 U.S.C. 154(b) by 460 days.

(21) Appl. No.: 18/431,118

(22) Filed: Feb. 2, 2024

(65) Prior Publication Data

US 2025/0250029 A1 Aug. 7, 2025

(51) Int. Cl.
*B64F 5/60* (2017.01)
*B64D 27/10* (2006.01)

(52) U.S. Cl.
CPC ................ *B64F 5/60* (2017.01); *B64D 27/10* (2013.01)

(58) Field of Classification Search
CPC .................................. B64F 5/60; B64D 27/10
See application file for complete search history.

(56) References Cited

U.S. PATENT DOCUMENTS

2016/0153865 A1 6/2016 Lana
2016/0252420 A1 9/2016 Koonankeil
2017/0206303 A1 7/2017 Burkett
2022/0318994 A1 10/2022 Storozhuk
2023/0013891 A1* 1/2023 Lowe .................... B64D 27/18
2023/0106089 A1 4/2023 Rahman

OTHER PUBLICATIONS

EP Search Report for EP Patent Application No. 25155646.0 dated Jun. 27, 2025.

* cited by examiner

*Primary Examiner* — Yoshihisa Ishizuka
(74) *Attorney, Agent, or Firm* — Getz Balich LLC

(57) ABSTRACT

A method for validating a fluid flow requirement for at least one first part includes performing a fluid flow test on at least one first part by measuring a fluid flow rate of the fluid through a first fluid flow surface portion of the at least one first part, scanning the first fluid flow surface portion and generating first image data of the first fluid flow surface portion, determining a first effective air flow surface area of the first fluid flow surface portion using the first image data, determining a flow-area ratio of the first fluid flow surface portion using the measured fluid flow rate and the first effective air flow surface area, and validating the fluid flow requirement for at least one second part by inspecting the at least one second part using the determined first flow-area ratio for the at least one first part to determine an estimated fluid flow rate for the at least one second part.

20 Claims, 7 Drawing Sheets

SYSTEM AND METHOD FOR VALIDATING AIRCRAFT PROPULSION SYSTEM PARTS

TECHNICAL FIELD

This disclosure relates generally to aircraft propulsion system parts having fluid passages and, more particularly, to systems and methods for validating fluid flow requirements for aircraft propulsion system parts.

BACKGROUND OF THE ART

Equipment for aircraft propulsion systems, such as gas turbine engine parts, may include holes formed therethrough to direct a fluid (e.g., air). These holes may be carefully sized to direct a predetermined amount of fluid flow during operation of the associated aircraft propulsion system. Various systems and methods are known in the art for validating that parts satisfy fluid flow requirements. While these known systems and methods may be suitable for their intended purposes, there is always room in the art for improvement.

SUMMARY

It should be understood that any or all of the features or embodiments described herein can be used or combined in any combination with each and every other feature or embodiment described herein unless expressly noted otherwise.

According to an aspect of the present disclosure, a method for validating a fluid flow requirement for at least one aircraft propulsion system part is provided. The method includes performing a fluid flow test on at least one first aircraft propulsion system part by directing a fluid through one or more first apertures of the at least one first aircraft propulsion system part within a first fluid flow surface portion of the at least one first aircraft propulsion system part, and measuring a fluid flow rate of the fluid through the one or more first apertures. The method further includes scanning the first fluid flow surface portion with an imaging assembly and generating first image data of the first fluid flow surface portion with the imaging assembly. The first fluid flow surface portion forms at least a portion of each of the one or more first apertures. The method further includes determining a first effective air flow surface area of the first fluid flow surface portion using the first image data. The first effective air flow surface area is a first ratio of a first fluid flow area of the one or more first apertures at the first fluid flow surface portion and a first total surface area of the first fluid flow surface portion. The method further includes determining a flow-area ratio of the first fluid flow surface portion using the measured fluid flow rate and the first effective air flow surface area and validating the fluid flow requirement for at least one second aircraft propulsion system part, at a controller, by inspecting the at least one second aircraft propulsion system part using the determined first flow-area ratio for the at least one first aircraft propulsion system part to determine an estimated fluid flow rate for the at least one second aircraft propulsion system part and executing a comparison of the estimated fluid flow rate to a design flow rate threshold range for the at least one second aircraft propulsion system part.

In any of the aspects or embodiments described above and herein, each of the at least one second aircraft propulsion system part may be a discrete instance of the at least one first aircraft propulsion system part.

In any of the aspects or embodiments described above and herein, the at least one first aircraft propulsion system part and the at least one second aircraft propulsion system part may be different parts of a same part family.

In any of the aspects or embodiments described above and herein, the at least one first aircraft propulsion system part may include a plurality of first aircraft propulsion system parts. The method may further include determining an average flow-area ratio using the flow-area ratio of each first aircraft propulsion system part of the plurality of first aircraft propulsion system parts. Validating the fluid flow requirement for the at least one second aircraft propulsion system part may include inspecting the at least one second aircraft propulsion system part using the determined average flow-area ratio for the at least one first aircraft propulsion system part to determine the estimated fluid flow rate for the at least one second aircraft propulsion system part.

In any of the aspects or embodiments described above and herein, the at least one first aircraft propulsion system part may include a plurality of apertures. The one or more first apertures may be a subset plurality of the plurality of apertures.

In any of the aspects or embodiments described above and herein, validating the fluid flow requirement for the at least one second aircraft propulsion system part may include controlling the imaging assembly at the controller to scan a second fluid flow surface portion of the at least one second aircraft propulsion system part with the imaging device, generate second image data of the second fluid flow surface portion, and determine a second effective air flow surface area of the second fluid flow surface portion using the second image data. The second fluid flow surface portion may form at least a portion of each of one or more second apertures of the at least one second aircraft propulsion system part. The first fluid flow surface portion and the second fluid flow surface portion may be defined by a same boundary definition. The second effective air flow surface area may be a second ratio of a second fluid flow area of the one or more second apertures at the second fluid flow surface portion and a second total surface area of the second fluid flow surface portion.

In any of the aspects or embodiments described above and herein, validating the fluid flow requirement for the at least one second aircraft propulsion system part includes determining the at least one second aircraft propulsion system part is acceptable or unacceptable. The at least one second aircraft propulsion system part may be acceptable where the estimated fluid flow rate is within the design flow rate threshold range. The at least one second aircraft propulsion system part may be unacceptable where the estimated fluid flow rate is outside of the design flow rate threshold range.

In any of the aspects or embodiments described above and herein, performing the fluid flow test on the at least one first aircraft propulsion system part includes installing a fluid flow test assembly on the at least one first aircraft propulsion system part at the one or more first apertures, directing the fluid through the one or more first apertures with the fluid flow test assembly, and measuring the fluid flow rate of the fluid through the one or more first apertures with the fluid flow test assembly.

In any of the aspects or embodiments described above and herein, the first fluid flow area may be a first area of the one or more first apertures at the first fluid flow surface portion and the second fluid flow area may be a second area of the one or more second apertures at the second fluid flow surface portion.

According to another aspect of the present disclosure, an assembly for validating a fluid flow requirement for at least one aircraft propulsion system part includes an imaging device and a controller. The controller includes a processor in communication with a non-transitory memory storing instructions, which instructions when executed by the processor, cause the processor to scan a fluid flow surface portion of the at least one aircraft propulsion system part with the imaging device and generate image data of the fluid flow surface portion. The at least one aircraft propulsion system part includes a body and one or more apertures. The body forms the fluid flow surface portion. The body further forms an aperture inlet and an aperture outlet for each of the one or more apertures. The fluid flow surface portion forms one or both of the aperture inlet and the aperture outlet for each of the one or more apertures. The instructions, when executed by the processor, further cause the processor to determine an effective air flow surface area of the fluid flow surface portion using the image data. The effective air flow surface area is a ratio of a fluid flow area of the one or more first apertures at the fluid flow surface portion and a total surface area of the fluid flow surface portion. The instructions, when executed by the processor, further cause the processor to validate the fluid flow requirement for the at least one aircraft propulsion system part by inspecting the at least one aircraft propulsion system part using the determined effective air flow surface area and a predetermined flow-area ratio for the at least one aircraft propulsion system part to determine an estimated fluid flow rate for the at least one aircraft propulsion system part and executing a comparison of the estimated fluid flow rate to a design flow rate threshold range for the at least one aircraft propulsion system part.

In any of the aspects or embodiments described above and herein, the imaging device may be a three-dimensional (3D) scanning camera.

In any of the aspects or embodiments described above and herein, a first aircraft propulsion system part of the at least one aircraft propulsion system part may be different than a second aircraft propulsion system part of the at least one aircraft propulsion system part.

In any of the aspects or embodiments described above and herein, the fluid flow area may be an area of the one or more apertures at one or both of the aperture inlet and the aperture outlet of each of the one or more apertures.

In any of the aspects or embodiments described above and herein, the at least one first aircraft propulsion system part may include a plurality of apertures. The one or more apertures may be a subset plurality of the plurality of apertures within the fluid flow surface portion.

According to another aspect of the present disclosure, a method for validating a fluid flow requirement for at least one aircraft propulsion system part includes scanning a fluid flow surface portion of the at least one aircraft propulsion system part with an imaging assembly and generating image data of the fluid flow surface portion with the imaging assembly. The at least one aircraft propulsion system part includes a body and one or more apertures. The body forms the fluid flow surface portion. The body further forms an aperture inlet and an aperture outlet for each of the one or more apertures. The fluid flow surface portion forms one or both of the aperture inlet and the aperture outlet for each of the one or more apertures. The method further includes determining, at a controller, an effective air flow surface area of the fluid flow surface portion using the image data. The effective air flow surface area is a ratio of a fluid flow area of the one or more first apertures at the fluid flow surface portion and a total surface area of the fluid flow surface portion. The fluid flow area is an area of the one or more apertures at one or both of the aperture inlet and the aperture outlet of each of the one or more apertures. The method further includes validating, at the controller, the fluid flow requirement for the at least one aircraft propulsion system part by inspecting the at least one aircraft propulsion system part using the determined effective air flow surface area and a predetermined flow-area ratio for the at least one aircraft propulsion system part to determine an estimated fluid flow rate for the at least one aircraft propulsion system part and comparing the estimated fluid flow rate to a design flow rate threshold range for the at least one aircraft propulsion system part.

In any of the aspects or embodiments described above and herein, validating the fluid flow requirement for the at least one aircraft propulsion system part may include determining the at least one aircraft propulsion system part is acceptable or unacceptable. The at least one aircraft propulsion system part may be acceptable where the estimated fluid flow rate is within the design flow rate threshold range. The at least one aircraft propulsion system part may be unacceptable where the estimated fluid flow rate is outside of the design flow rate threshold range.

In any of the aspects or embodiments described above and herein, a first aircraft propulsion system part of the at least one aircraft propulsion system part may be different than a second aircraft propulsion system part of the at least one aircraft propulsion system part.

In any of the aspects or embodiments described above and herein, a first aircraft propulsion system part of the at least one aircraft propulsion system part may be the same as a second aircraft propulsion system part of the at least one aircraft propulsion system part.

In any of the aspects or embodiments described above and herein, the fluid flow surface portion may be a portion of a body surface area of the body.

In any of the aspects or embodiments described above and herein, the image data may be three-dimensional (3D) image data.

The present disclosure, and all its aspects, embodiments and advantages associated therewith will become more readily apparent in view of the detailed description provided below, including the accompanying drawings.

DETAILED DESCRIPTION

Figure 1:
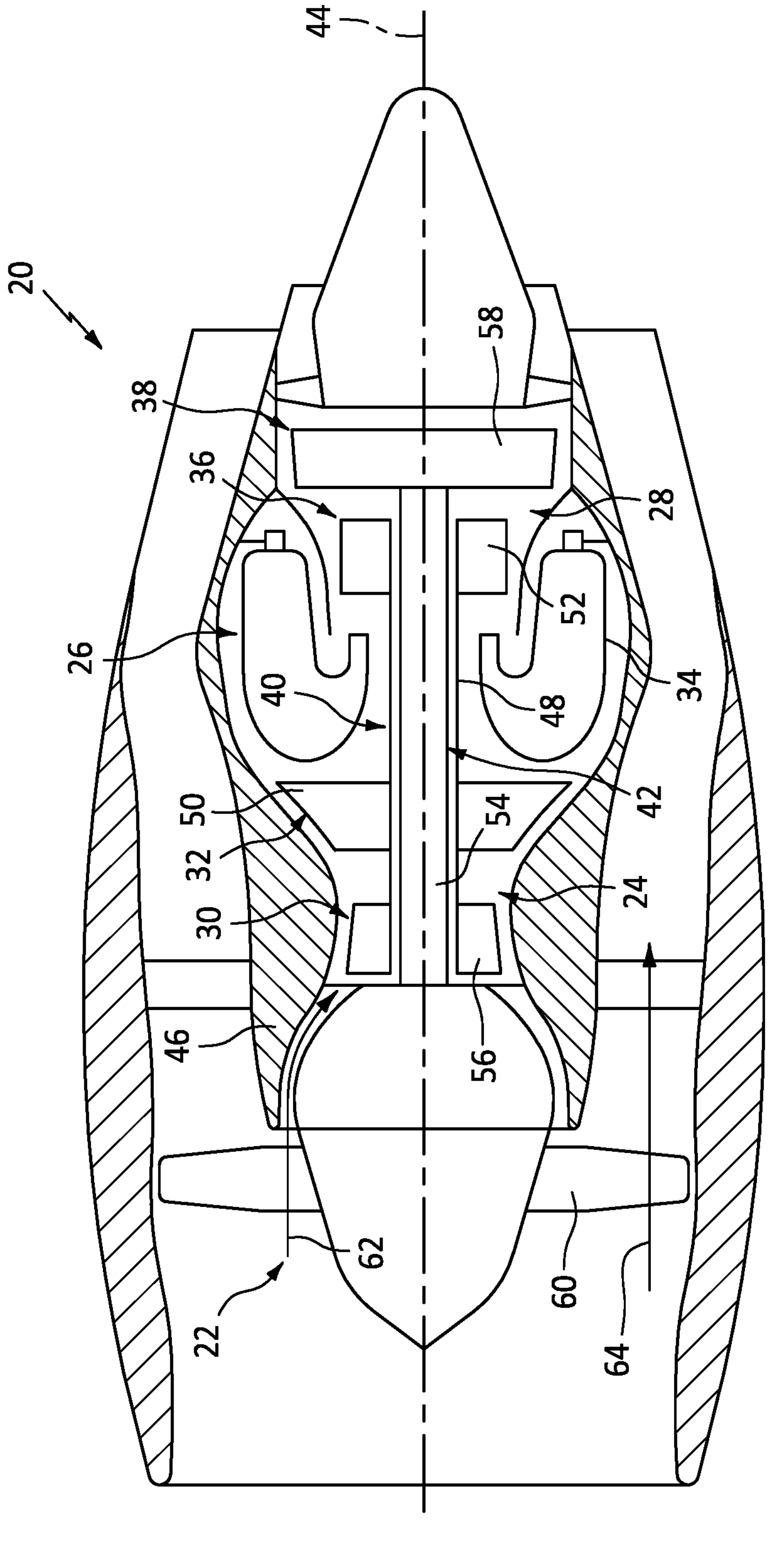
FIG. 1 schematically illustrates a cutaway, side view of a gas turbine engine for an aircraft propulsion system, in accordance with one or more embodiments of the present disclosure.

FIG. 1 schematically illustrates a gas turbine engine 20. The gas turbine engine 20 of FIG. 1 is a multi-spool turbofan gas turbine engine for an aircraft propulsion system. However, while the following description and accompanying drawings may refer to the turbofan gas turbine engine 20 of FIG. 1 as an example, it should be understood that aspects of the present disclosure may be equally applicable to other types of gas turbine engines including, but not limited to, a turboshaft gas turbine engine, a turboprop gas turbine engine, a turbojet gas turbine engine, a propfan gas turbine engine, or an open rotor gas turbine engine. Moreover, aspects of the present disclosure may also be equally applicable to engines (e.g., intermittent combustion engines), propulsion systems, and equipment other than gas turbine engines for aircraft propulsion systems.

The gas turbine engine 20 of FIG. 1 includes a fan section 22, a compressor section 24, a combustor section 26, and a turbine section 28. For example, the compressor section 24 of FIG. 1 includes a low-pressure compressor (LPC) 30 and a high-pressure compressor (HPC) 32, the combustor section 16 includes a combustor 34 (e.g., an annular combustor) forming a combustion chamber, and the turbine section 28 includes a high-pressure turbine (HPT) 36 and a low-pressure turbine (LPT) 38.

The gas turbine engine 20 sections 22, 24, 28 form a first rotational assembly 40 (e.g., a high-pressure spool) and a second rotational assembly 42 (e.g., a low-pressure spool) of the gas turbine engine 20. The first rotational assembly 40 and the second rotational assembly 42 are mounted for rotation about a rotational axis 44 (e.g., an axial centerline of the gas turbine engine 20) relative to the engine static structure 46 of the gas turbine engine 20. The engine static structure 46 may include one or more engine cases, cowlings, bearing assemblies, and/or other non-rotating structures configured to house and/or support components of the gas turbine engine 20 sections 22, 24, 26, 28.

The first rotational assembly 40 includes a first shaft 48, a bladed first compressor rotor 50 for the high-pressure compressor 32, and a bladed first turbine rotor 52 for the high-pressure turbine 36. The first shaft 48 interconnects the bladed first compressor rotor 50 and the bladed first turbine rotor 52.

The second rotational assembly 42 includes a second shaft 54, a bladed second compressor rotor 56 for the low-pressure compressor 30, and a bladed second turbine rotor 58 for the low-pressure turbine 38. The second shaft 54 interconnects the bladed second compressor rotor 56 and the bladed second turbine rotor 58. The second shaft 54 of FIG. 1 additionally interconnects the bladed second compressor rotor 56 and the bladed second turbine rotor 58 with a bladed fan rotor 60 for the fan section 22. The second shaft 54 may alternatively be coupled to the bladed fan rotor 60 (e.g., an input shaft of the bladed fan rotor 60) by a reduction gear assembly configured to drive the bladed fan rotor 60 at a reduced rotational speed relative to the second shaft 54.

In operation of the gas turbine engine 20 of FIG. 1, ambient air is directed through the fan section 22 and into a core flow path 62 and a bypass flow path 64 by rotation of the bladed fan rotor 60. Airflow along the core flow path 62 is compressed by the low-pressure compressor 30 and the high-pressure compressor 32, mixed and burned with fuel in the combustor 34, and then directed through the high-pressure turbine 36 and the low-pressure turbine 38. The bladed first turbine rotor 52 and the bladed second turbine rotor 58 rotationally drive the first rotational assembly 40 and the second rotational assembly 42, respectively, in response to the combustion gas flow through the high-pressure turbine 36 and the low-pressure turbine 38. The first shaft 48 and the second shaft 54 are concentric and rotate about the rotational axis 44. The present disclosure, however, is not limited to concentric configurations of the first shaft 48 and the second shaft 54 and the first shaft 48 and the second shaft 54 may alternatively be configured for rotation about discrete rotational axes.

Figure 3:
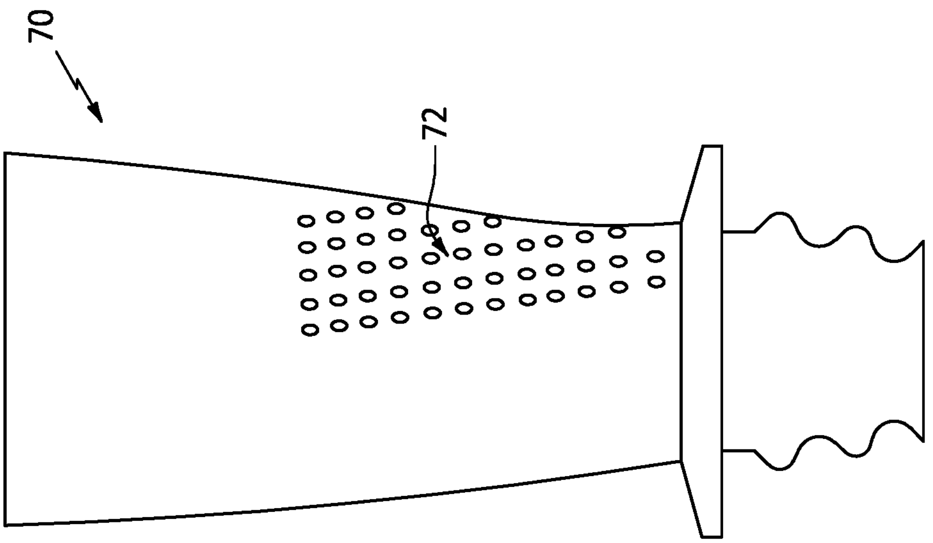
FIG. 3 schematically illustrates a turbine blade for the gas turbine engine of FIG. 1, in accordance with one or more embodiments of the present disclosure.
Figure 2:
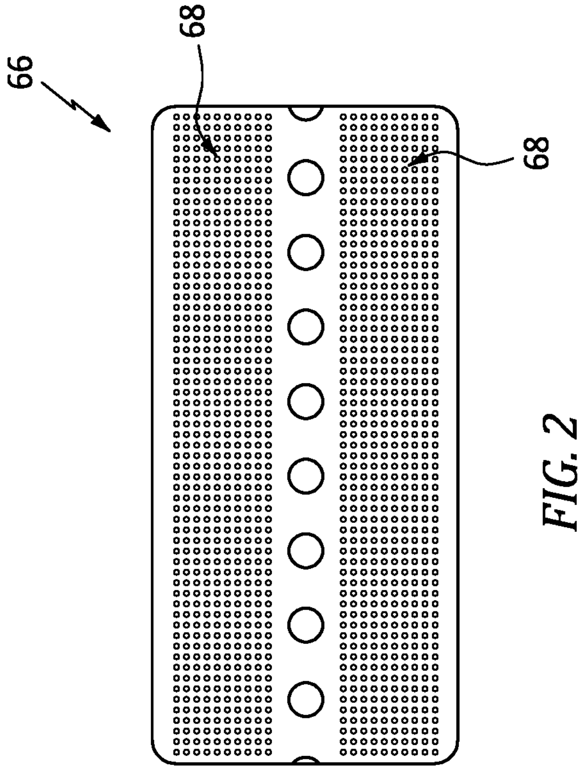
FIG. 2 schematically illustrates a combustor liner for the gas turbine engine of FIG. 1, in accordance with one or more embodiments of the present disclosure.

The gas turbine engine 20 includes a plurality of parts configured with cooling holes, fluid (e.g., air) passages, and other apertures for cooling parts, pressurizing seals, bleeding air, supplying air for combustion, and other purposes. For example, FIG. 2 illustrates an exemplary combustor liner 66 (e.g., an annular combustor liner) which may form a portion of the combustor 34 facing the combustion chamber. The combustor liner 66 includes a plurality of liner apertures 68. The liner apertures 68 are configured to direct cooling air flow (e.g., from the compressor section 24) through the combustor liner 66 and into the combustion chamber to facilitate effusion and/or film cooling of the combustor liner 66. For further example, FIG. 3 illustrates an exemplary airfoil 70 for a turbine rotor blade (e.g., a rotor blade from the bladed first turbine rotor 52 or the bladed second turbine rotor 58). The airfoil 70 includes a plurality of airfoil apertures 72. The airfoil apertures 72 are configured to direct cooling air flow (e.g., from the compressor section 24) through the airfoil 70 to facilitate cooling of the airfoil 70. The present disclosure, however, is not limited to the foregoing exemplary parts (e.g., the combustor liner 66 and the airfoil 70), and is also applicable to other parts such as, but not limited to, combustor heat shields and bulkheads, diffuser cases, stator vanes, and the like.

Apertures, such as the liner apertures 68 and the airfoil apertures 72 discussed above, may be formed through parts by laser drilling, water jet drilling, machining, and other suitable processes during the manufacture and/or repair of these parts. In some cases, the parts may be coated with a heat resistant coating and/or other coatings before or after formation of the apertures in the part. In some other cases, the parts may be stripped of a preexisting (e.g., degraded) coating and subsequently recoated. Aperture drilling tolerances, coating overhang or penetration into the apertures, and other factors may affect a shape, and hence a fluid flow rate, through the apertures. Accordingly, parts may be subjected to extensive and time-consuming experimental fluid flow testing to verify that the parts are compliant with their design fluid flow requirements.

Figure 4:
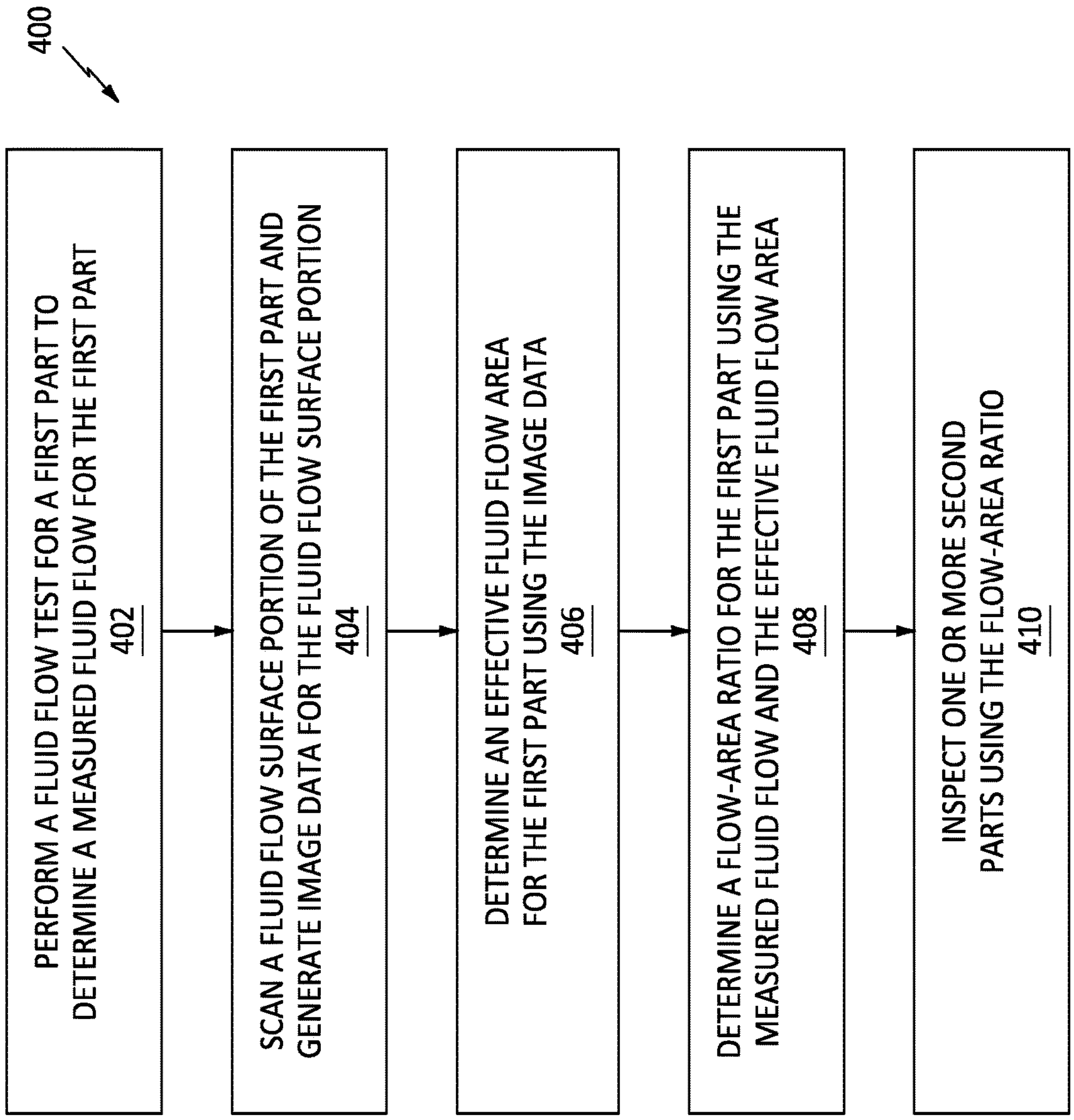
FIG. 4 illustrates a block diagram depicting a method for validating a fluid flow requirement for one or more parts, in accordance with one or more embodiments of the present disclosure.

Referring to FIG. 4, a method 400 for validating a fluid flow requirement for one or more parts is provided. FIG. 4 illustrates a flowchart for the Method 400. Unless otherwise noted herein, it should be understood that the steps of method 400 are not required to be performed in the specific sequence in which they are discussed below and, in some embodiments, the steps of the method 400 may be performed separately or simultaneously.

Figure 5:
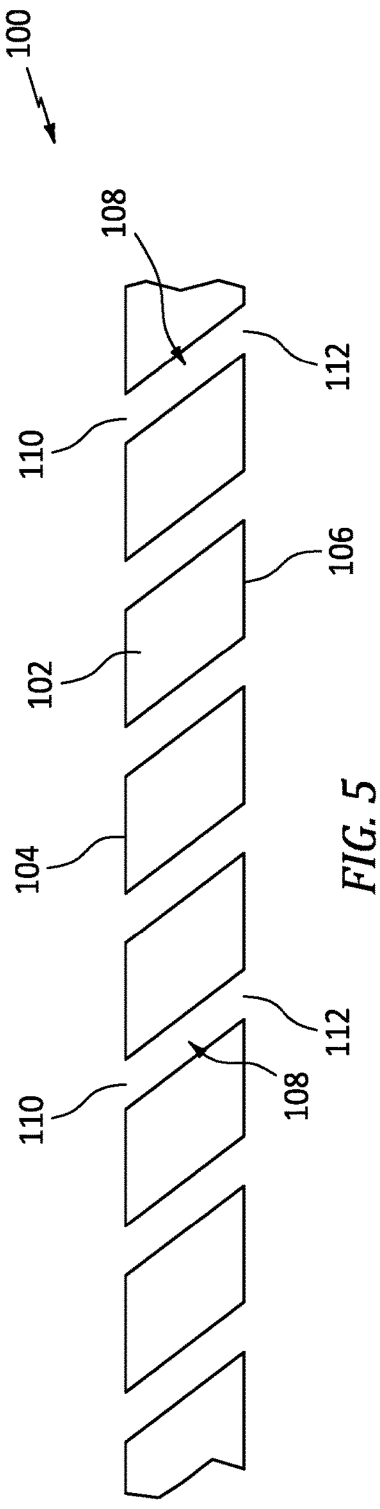
FIG. 5 illustrates a side, cutaway view of a part including a plurality of apertures, in accordance with one or more embodiments of the present disclosure.

Step 402 includes performing a fluid (e.g., air) flow test for a first part, such as the first part 100 illustrated in FIG. 5. FIG. 5 illustrates a cutaway view of a portion of the first part 100. The first part 100 includes a body 102. The body 102 extends between and to an inner side surface 104 of the body 102 and an outer side surface 106 of the body 102. The first part 100 includes a plurality of apertures 108 formed through the body 102. The apertures 108 of FIG. 5 extend through the body 102 between and to the inner side surface 104 and the outer side surface 106. Each of the apertures 108 extends between and to an aperture inlet 110 and an aperture outlet 112. The aperture inlet 110 is disposed at (e.g., on, adjacent, or proximate) the inner side surface 104. The aperture outlet 112 is disposed at (e.g., on, adjacent, or proximate) the outer side surface 106.

Figure 6:
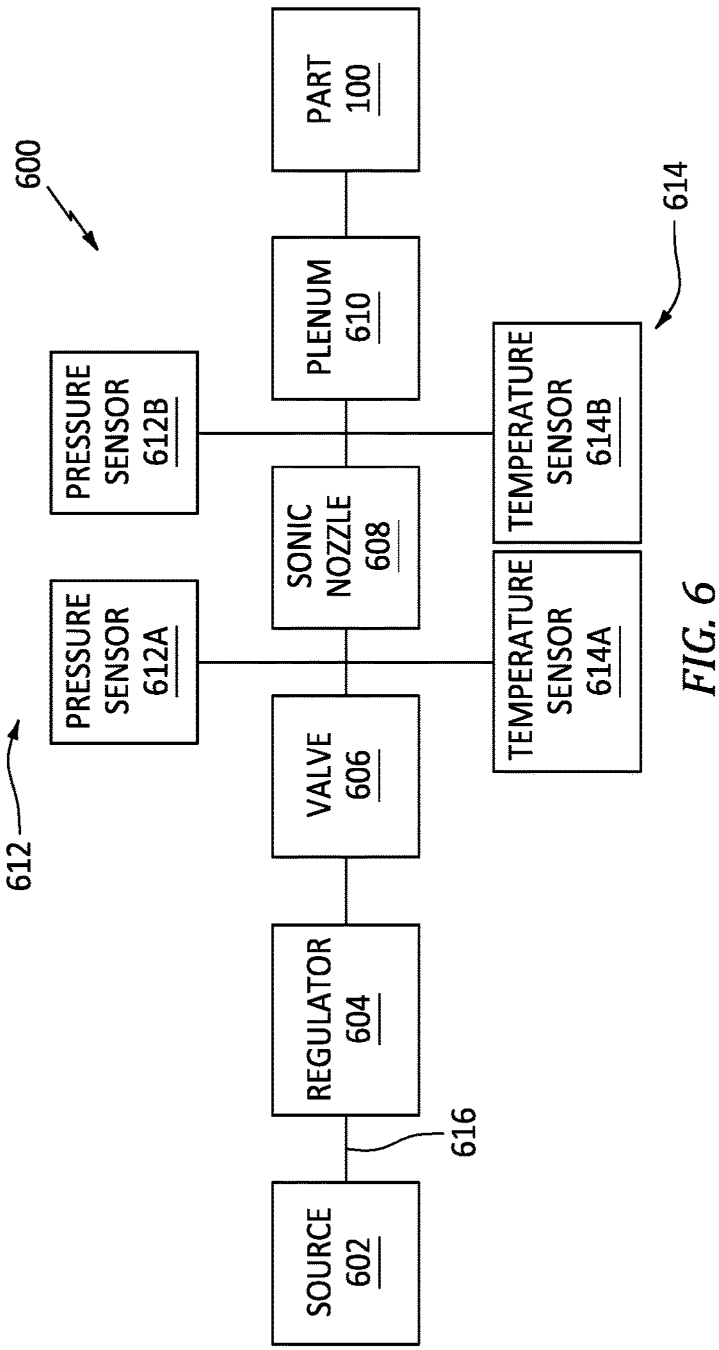
FIG. 6 illustrates a block diagram depicting a fluid flow test assembly, in accordance with one or more embodiments of the present disclosure.

FIG. 6 illustrates a block diagram of an exemplary fluid flow test assembly 600 which may be used to perform the fluid flow test for the first part 100. The fluid flow test assembly 600 includes a fluid source 602, a regulator 604, a valve 606, a sonic nozzle 608, a plenum 610, a plurality of pressure sensors 612, and a plurality of temperature sensors 614. A conduit 616 connects the fluid source 602, the regulator 604, the valve 606, the sonic nozzle 608, and the plenum 610 together in fluid communication. The conduit 616 may further surround and form the plenum 610. The fluid source 602 is configured to form and/or store a pressurized fluid (e.g., air) for use by the fluid flow test assembly 600. The regulator 604 is configured to control a flow rate (e.g., a mass flow rate) of the fluid, through the conduit 616, from the fluid source 602 to the plenum 610 during a fluid flow test. The sonic nozzle 608 (also known as a "critical flow venturi" or a "critical flow nozzle") is configured as a converging-diverging flowmeter. The sonic nozzle 608 facilitates measurement of a flow rate (e.g., a mass flow rate) of the fluid through the fluid flow test assembly 600. A first pressure sensor 612A of the pressure sensors 612 and a first temperature sensor 614A of the temperature sensors 614 is disposed upstream of the sonic nozzle 608 and connected in fluid communication with the conduit 616. A second pressure sensor 612B of the pressure sensors 612 and a second temperature sensor 614B of the temperature sensors 614 is disposed upstream of the sonic nozzle 608 and connected in fluid communication with the conduit 616. The present disclosure, however, is not limited to the foregoing exemplary configuration of the fluid flow test assembly 600 for performing a fluid flow test of the first part 100.

Figure 7:
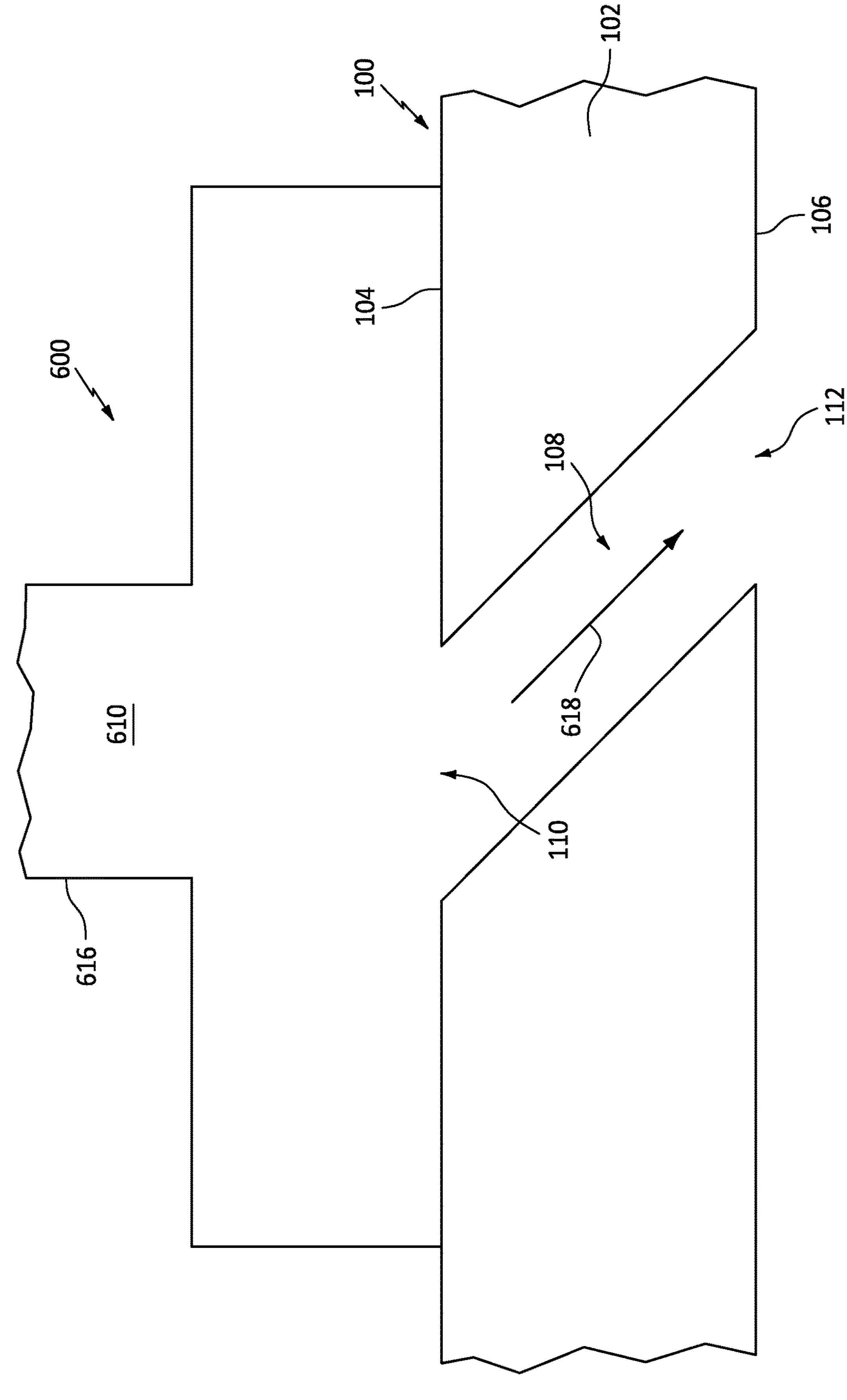
FIG. 7 schematically illustrates the fluid flow test assembly of FIG. 6 installed on the part of FIG. 5, in accordance with one or more embodiments of the present disclosure.

FIG. 7 schematically illustrates the fluid flow test assembly 600 (e.g., the plenum 610) connected in fluid communication (e.g., pneumatically connected) with the first part 100 by the conduit 616. In FIG. 7, the conduit 616 is connected to the body 102 at (e.g., on, adjacent, or proximate) the inner side surface 104. However, the conduit 616 may alternatively be connected to the body 102 at (e.g., on, adjacent, or proximate) the outer side surface 106. The conduit 616 of FIG. 7 is connected to the inner side surface 104 circumscribing the apertures 108 (e.g., the aperture inlet 110 of each of the apertures 108) such that the plenum 610 is connected in fluid communication with the apertures 108. In operation, a fluid 618 is directed from the fluid flow test assembly 600 and through the first part 100 via the apertures 108. The fluid flow test assembly 600 measures the flow rate of the fluid 618 through the fluid flow test assembly 600 and the first part 100. For example, measured temperatures and differential pressures of the fluid 618 through the sonic nozzle 608, provided by the pressure sensors 612 and the temperature sensors 614, may be used to determine the flow rate of the fluid 618 directed through the sonic nozzle 608 and, hence, the flow rate of the fluid 618 directed through the first part 100 during a fluid flow test for the first part 100. The fluid flow test assembly 600 (e.g., the regulator 604) may measure the flow rate while controlling the fluid 618 to establish a predetermined pressure ratio across the first part 100, for example, a differential pressure between the inner side surface 104 and the outer side surface 106 (e.g., atmospheric pressure). The measured flow rate through the first part 100 may be verified to be acceptable or unacceptable by executing a comparison of the measured flow rate to a design flow rate threshold range. For example, the measured flow rate for the first part 100 may be used to validate the first part 100 as acceptable for installation and use (e.g., in the gas turbine engine 20; see FIG. 1) where the measured flow rate is within the design flow rate threshold range and the measured flow rate for the first part 100 may be unacceptable for installation and use where the measured flow rate is outside of the design flow rate threshold range. It will be appreciated that, although only one of the apertures 108 is shown in FIG. 7, the fluid flow test assembly 600 (e.g., the plenum 610) is designed to simultaneously direct the fluid 618 through all or a substantial portion of the apertures 108.

Figure 8:
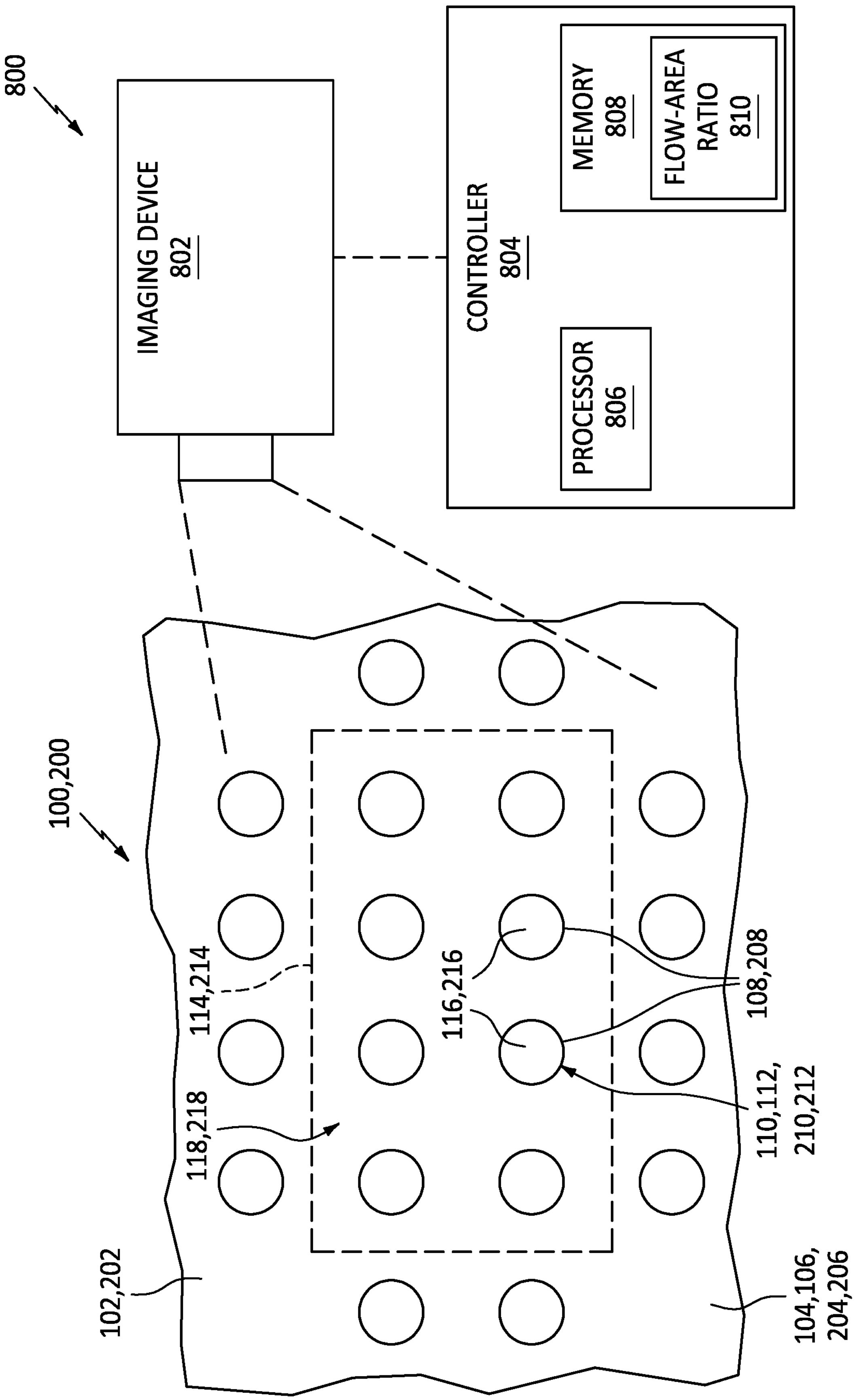
FIG. 8 schematically illustrates an imaging assembly for a part of FIG. 5, in accordance with one or more embodiments of the present disclosure.

Step 404 includes scanning a fluid flow surface portion of the first part 100. As shown in FIG. 8, an imaging assembly 800 may be used to scan a fluid flow surface portion 114 of the first part 100 and capture image data for the fluid flow surface portion 114. The fluid flow surface portion 114 may include a portion of a total surface area of the first part 100, within which portion the apertures 108 (e.g., the aperture inlet 110 and/or the aperture outlet 112 of the apertures 108) are disposed. For example, step 404 may include sampling a representative portion of the first part 100 by scanning the fluid flow surface portion 114, which fluid flow surface portion 114 may include a subset plurality of the apertures 108 of the component 100. In other words, a first subset of the apertures 108 may be disposed within the fluid flow surface portion 114 and a second subset of the apertures 108 may be disposed outside of the fluid flow surface portion 114. The area (e.g., the bounds) of the fluid flow surface portion 114 may be determined using a predetermined boundary definition of the fluid flow surface portion 114 for the component 100. As an example, the boundary definition may define an area (e.g., the fluid flow surface portion 114) of the component 100 bounded by an outer radial position, an inner radial position, and circumferential end positions, for configurations of the component 100 which are annular or otherwise arranged about a center axis (see, e.g., the combustor liner 66 of FIG. 2). For example, the boundary definition may identify a sample area of the component 100 including a subset plurality of the apertures 108 within a 25-degree circumferential portion of the component 100 (e.g., relative to the component 100 center axis). For other configurations of the component 100 (see, e.g., the airfoil 70 of FIG. 3), the boundary definition may define a length and a width of the fluid flow surface portion 114 within which the subset plurality of the apertures 108 is disposed. Alternatively, the fluid flow surface portion 114 may include all or a substantial portion of the total surface area of the first part 100, within which fluid flow surface portion 114 the apertures 108 (e.g., the aperture inlet 110 and/or the aperture outlet 112 of the apertures 108) are disposed. The fluid flow surface portion 114 may be understood to form a portion (e.g., the aperture inlet 110 and/or the aperture outlet 112) of each of the apertures 108. The fluid flow surface portion 114 may include portions of the inner side surface 104, the outer side surface 106, or the inner side surface 104 and the outer side surface 106 at (e.g., on, adjacent, or proximate) the apertures 108.

The imaging assembly 800 of FIG. 8 includes an imaging device 802 (e.g., a camera) and a controller 804. The imaging device 802 may be configured, for example, as a three-dimensional (3D) scanning camera configured to capture (e.g., generate) 3D image data representative of scanned portions of a part (e.g., the first part 100). The imaging device 802 may be movable relative to the first part 100. For example, a position of the imaging device 802 may be controlled by a coordinate measuring machine (CMM) or other computer numerical control (CNC) system configured to position the imaging device 802 relative to the first part 100. The present disclosure, however, is not limited to any particular configuration of the imaging device 802.

The controller 804 is connected in communication (e.g., signal communication) with at least some of the components of the imaging assembly 800, including the imaging device 802, to control and/or receive signals therefrom to perform the functions described herein. The controller 804 includes a processor 806 connected in signal communication with memory 808. The processor 806 may include any type of computing device, computational circuit, processor(s), CPU, computer, or the like capable of executing a series of instructions that are stored in the memory 808. Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. The instructions may include an operating system, and/or executable software modules such as program files, system data, buffers, drivers, utilities, and the like. The executable instructions may apply to any functionality described herein to enable the imaging assembly 800 to accomplish the same algorithmically and/or coordination of device components. The memory 808 may include a single memory device or a plurality of memory devices (e.g., a computer-readable storage device that can be read, written, or otherwise accessed by a general purpose or special purpose computing device), including any processing electronics and/or processing circuitry capable of executing instructions. The present disclosure is not limited to any particular type of memory device, which may be non-transitory, and may include read-only memory, random access memory, volatile memory, non-volatile memory, static memory, dynamic memory, flash memory, cache memory, volatile or non-volatile semiconductor memory, optical disk storage, magnetic disk storage, magnetic tape, other magnetic storage devices, or any other medium capable of storing one or more instructions, and/or any device that stores digital information. The memory device(s) maybe directly or indirectly coupled to the controller 804. The controller 804 may include, or may be in communication with, an input device that enables a user to enter data and/or instructions, and may include, or be in communication with, an output device configured, for example to display information (e.g., a visual display or a printer), or to transfer data, etc. Communications between the controller 804 and the imaging assembly 800 and its components may be via a hardwire connection or via a wireless connection. A person of skill in the art will recognize that portions of the controller may assume various forms (e.g., digital signal processor, analog device, etc.) capable of performing the functions described herein.

Step 406 includes determining (e.g., calculating) an effective fluid flow area for the fluid flow surface portion 114 using the image data (e.g., 3D image data) captured in step 404. The effective flow fluid flow area may be understood as a ratio of a fluid flow area 116 of the fluid flow surface portion 114 and a total surface area 118 of the fluid flow surface portion 114. The fluid flow area 116 includes an area at (e.g., on, adjacent, or proximate) the fluid flow surface portion 114 formed by the apertures 108. For example, the fluid flow area 116 may include a total area of the apertures 108 (e.g., the aperture inlet 110 and/or the aperture outlet 112) along the fluid flow surface portion 114. The total surface area 118 of the fluid flow surface portion 114 is a combined area of the fluid flow area 116 and a total surface area of the body 102 (e.g., the inner side surface 104 and/or the outer side surface 106) within the fluid flow surface portion 114. The fluid flow area 116 may be determined (e.g., at the controller 804) by identifying locations and bounds of the apertures 108 along the fluid flow surface portion 114 using the image data captured in step 404. The fluid flow area 116 of the apertures 108 may be determined (e.g., at the controller 804) by identifying a diameter d of each of the apertures 108 within the fluid flow surface portion 114 using the image data. For example, the fluid flow area 116 may be determined using the following equation [1] for all of the apertures 108 within the fluid flow surface portion 114:

$$A_{FluidFlow} = \sum \frac{\pi}{4} d^2 \qquad [1]$$

Similarly, the total surface area 118 may be determined (e.g., at the controller 804) using the image data captured in step 404.

Step 408 includes determining (e.g., calculating) a fluid flow rate (e.g., mass flow rate) to effective fluid flow area ratio (hereinafter a "flow-area ratio") for the first part 100. For example, the controller 804 may determine a flow-area ratio 810 for the first part 100 using the measured flow rate determined in step 402 and the effective fluid flow area of the fluid flow surface portion 114 determined in step 406. The flow-area ratio 810 thereby establishes a correlation between an effective fluid flow area of a part (e.g., the first part 100) and an actual flow rate of fluid through the part (e.g. the first part 100) for a given application of a fluid flow test (see step 402). The determined value of the flow-area ratio 810 may be stored at the controller 804 (e.g., in memory 808) for further use.

With continued reference to FIG. 8, step 410 includes inspecting one or more second parts 200 using the flow-area ratio 810 determined for the first part 100. Each of the second parts 200 may be a discrete instance of the first part 100 (e.g., the first part 100 and the second parts 200 may be a same part design, a same part model, or the like). Accordingly, each of the second parts 200 may be the same as or substantially the same as the first part 100 accounting for small manufacturing (e.g., aperture drilling) and coating variations, as previously discussed. Alternatively, one or more of the second parts 200 may be related to but different than the first part 100. For example, the first part 100 and the second parts 200 may be included in a part family of related parts (e.g., different combustor liner models configured for use with a same or similar gas turbine engine design).

Each of the second parts 200 has structural characteristics similar to those described above for the first part 100 (see, e.g., FIG. 5). For example, as shown in FIG. 8, each of the second parts 200 includes a body 202. The body 202 extends between and to an inner side surface 204 of the body 202 and an outer side surface 206 of the body 202. Each of the second parts 200 includes a plurality of apertures 208 formed through the body 202. The apertures 208 extend through the body 202 between and to the inner side surface 204 and the outer side surface 206. Each of the apertures 208 extends between and to an aperture inlet 210 and an aperture outlet 212. The aperture inlet 210 is disposed at (e.g., on, adjacent, or proximate) the inner side surface 204. The aperture outlet 212 is disposed at (e.g., on, adjacent, or proximate) the outer side surface 206.

Step 410 includes scanning a fluid flow surface portion 214 of each of the second parts 200 using the imaging assembly 800, for example, as described above with respect to the first part 100 (see step 404). The fluid flow surface portion 214 may be the same (e.g., the same area) as the fluid flow surface portion 114 or otherwise be defined by a same or similar boundary definition. Using image data (e.g., 3D image data) captured by the imaging device 802 for the fluid flow surface portion 214 of each of the second parts 200, the controller 804 may determine (e.g., calculate) an effective fluid flow area for the fluid flow surface portion 214 of each of the second parts 200, for example, as described above with respect to the first part 100 (see step 406). The effective fluid flow area for the fluid flow surface portion 214 is a ratio of a fluid flow area 216 of the fluid flow surface portion 214 and a total surface area 218 of the fluid flow surface portion 214.

Step 410 includes determining (e.g., calculating) an estimated fluid flow rate for each of the second parts 200 using the measured effective fluid flow area for each respective one of the second parts 200 and the flow-area ratio 810 determined for the first part 100. The estimated flow rate through each of the second parts 200 may be verified to be acceptable or unacceptable by executing (e.g., at the controller 804) a comparison of the estimated flow rate to a design flow rate threshold range for each respective one of the second parts 200. The design flow rate threshold range for one or more of the second parts 200 may be the same as or similar to the design flow rate threshold range for the first part 100. The estimated flow rate for the each of the second parts 200 may be used to validate the each respective one of the second parts 200 as acceptable for installation and use (e.g., in the gas turbine engine 20; see FIG. 1) where the estimated flow rate is within the design flow rate threshold range for each respective one of the second parts 200. Conversely, the estimated flow rate for each of the second parts 200 may be used to identify each respective one of the second parts 200 as unacceptable for installation and use where the estimated flow rate is outside of the design flow rate threshold range for each respective one of the second parts 200.

Accordingly, the present disclosure facilitates flow rate validation for these second parts 200 without the need for the performance of a fluid flow test (see step 402), thereby saving considerable time and expense for part manufacture and repair. Moreover, at least some other part validation processes, of which I am aware, require the use of complex 3D part models (e.g., a full digitized model of a part; a 3D computer-aided design (CAD) or computer-aided manufacturing (CAM) model) for identifying structural fluid flow characteristics of parts. However, the data volume of these 3D part models can be overwhelming even for modern computer systems, and may require enhanced computation power due to the need for multi-stage computation (e.g., data acquisition and data post-processing to condition a 3D part model for use by metrology software, to compute feature geometries, or the like). In contrast, the present disclosure facilitates a reduction in flow rate validation data volume and computational requirements by effecting part flow rate validation without the need for complex 3D models of the parts to be validated.

Figure 9:
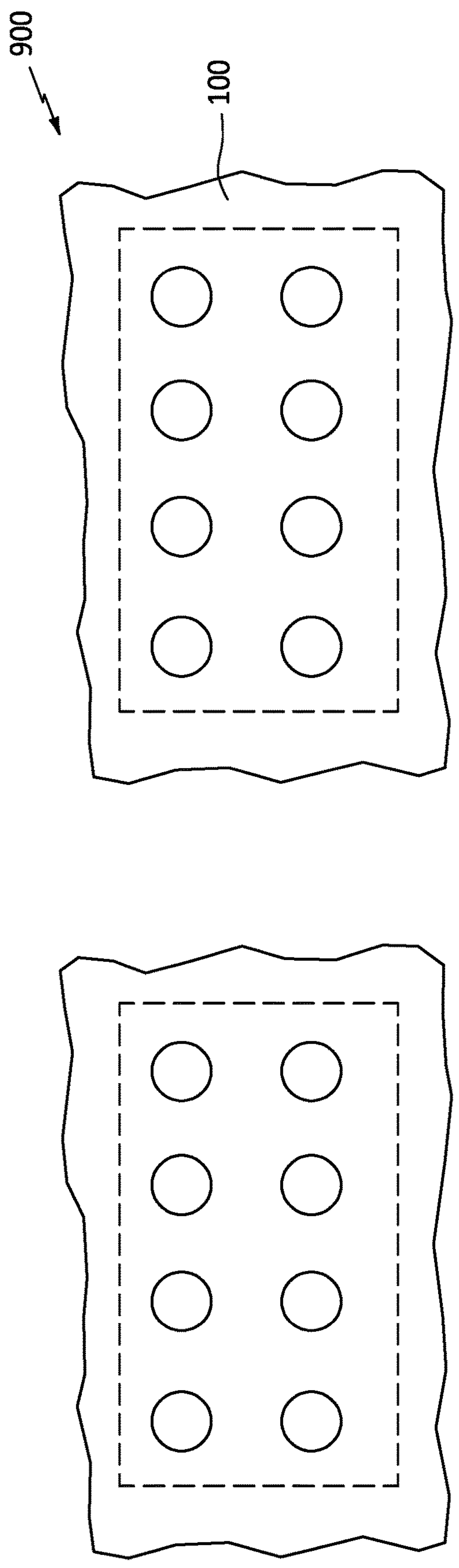
FIG. 9 schematically illustrates a plurality of parts which may be validated using the method of FIG. 4, in accordance with one or more embodiments of the present disclosure.

Referring to FIG. 9, in some embodiments, steps 402, 404, 406, and 408 may be performed for a plurality of parts 900, including the first part 100, to determine the flow-area ratio 810 (see FIG. 8) for the plurality of parts 900. Each of the parts of the plurality of parts 900 may be a discrete instance of the first part 100 (e.g., the first part 100 and the other parts of the plurality of parts 900 may be a same part design, a same part model, or the like). The flow-area ratio 810 may be an average (e.g., an average flow-area ratio) of a determined flow-area ratio for each part of the plurality of parts 900. Step 410 may include determining (e.g., calculating) an estimated fluid flow rate for each of the second parts 200 using the measured effective fluid flow area for each respective one of the second parts 200 and the average flow-area ratio 810 determined for the plurality of parts 900.

Figure 10:
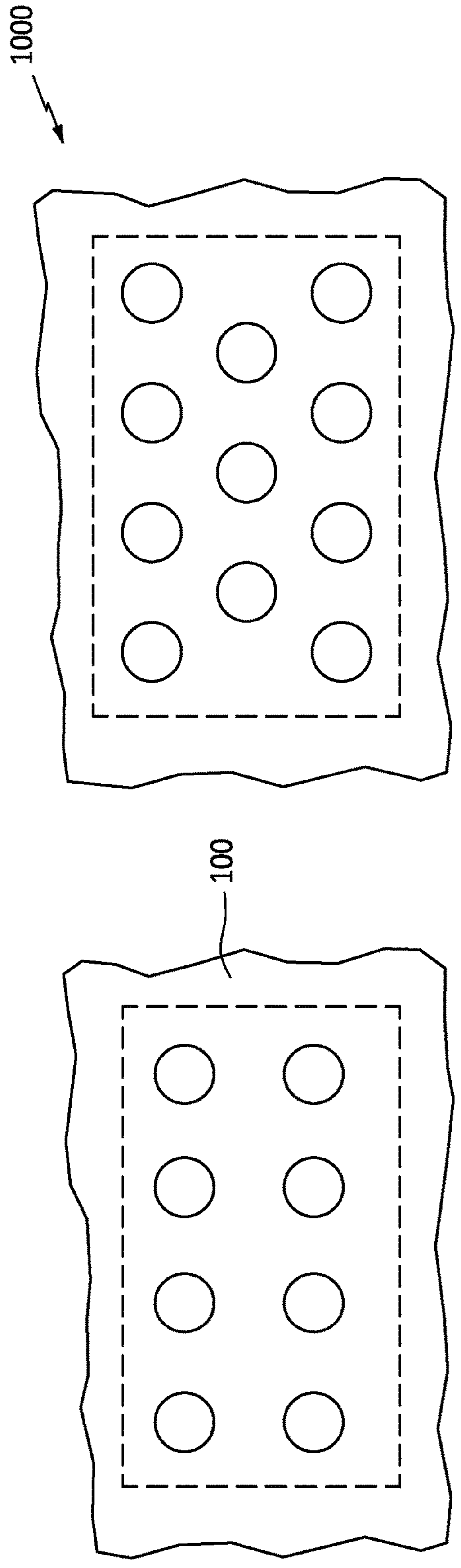
FIG. 10 schematically illustrates another plurality of parts which may be validated using the method of FIG. 4, in accordance with one or more embodiments of the present disclosure.

Referring to FIG. 10, in some embodiments, steps 402, 404, 406, and 408 may be performed for a plurality of parts 1000, including the first part 100, to determine the flow-area ratio 810 (see FIG. 8) for the plurality of parts 1000. One or more of the parts of the plurality of parts 1000 may be related to but different than at least one other part of the plurality of parts 1000. For example, the plurality of parts 1000 may be representative of a part family of related parts (e.g., different combustor liner models configured for use with a same or similar gas turbine engine design). The flow-area ratio 810 may be an average (e.g., an average flow-area ratio) of a determined flow-area ratio for each part of the plurality of parts 1000. Step 410 may include determining (e.g., calculating) an estimated fluid flow rate for each of the second parts 200 using the measured effective fluid flow area for each respective one of the second parts 200 and the average flow-area ratio 810 determined for the plurality of parts 1000.

While the principles of the disclosure have been described above in connection with specific apparatuses and methods, it is to be clearly understood that this description is made only by way of example and not as limitation on the scope of the disclosure. Specific details are given in the above description to provide a thorough understanding of the embodiments. However, it is understood that the embodiments may be practiced without these specific details.

It is noted that the embodiments may be described as a process which is depicted as a flowchart, a flow diagram, a block diagram, etc. Although any one of these structures may describe the operations as a sequential process, many of the operations can be performed in parallel or concurrently. In addition, the order of the operations may be rearranged. A process may correspond to a method, a function, a procedure, a subroutine, a subprogram, etc.

The singular forms "a," "an," and "the" refer to one or more than one, unless the context clearly dictates otherwise. For example, the term "comprising a specimen" includes single or plural specimens and is considered equivalent to the phrase "comprising at least one specimen." The term "or" refers to a single element of stated alternative elements or a combination of two or more elements unless the context clearly indicates otherwise. As used herein, "comprises" means "includes." Thus, "comprising A or B," means "including A or B, or A and B," without excluding additional elements.

It is noted that various connections are set forth between elements in the present description and drawings (the contents of which are included in this disclosure by way of reference). It is noted that these connections are general and, unless specified otherwise, may be direct or indirect and that this specification is not intended to be limiting in this respect. Any reference to attached, fixed, connected, or the like may include permanent, removable, temporary, partial, full and/or any other possible attachment option.

No element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprise", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various inventive aspects, concepts and features of the disclosures may be described and illustrated herein as embodied in combination in the exemplary embodiments, these various aspects, concepts, and features may be used in many alternative embodiments, either individually or in various combinations and sub-combinations thereof. Unless expressly excluded herein all such combinations and sub-combinations are intended to be within the scope of the present application. Still further, while various alternative embodiments as to the various aspects, concepts, and features of the disclosures—such as alternative materials, structures, configurations, methods, devices, and components, and so on—may be described herein, such descriptions are not intended to be a complete or exhaustive list of available alternative embodiments, whether presently known or later developed. Those skilled in the art may readily adopt one or more of the inventive aspects, concepts, or features into additional embodiments and uses within the scope of the present application even if such embodiments are not expressly disclosed herein. For example, in the exemplary embodiments described above within the Detailed Description portion of the present specification, elements may be described as individual units and shown as independent of one another to facilitate the description. In alternative embodiments, such elements may be configured as combined elements.

The invention claimed is:

1. A method for validating a fluid flow requirement for at least one aircraft propulsion system part, the method comprising:

performing a fluid flow test on at least one first aircraft propulsion system part by directing a fluid through one or more first apertures of the at least one first aircraft propulsion system part within a first fluid flow surface portion of the at least one first aircraft propulsion system part, and measuring a fluid flow rate of the fluid through the one or more first apertures;

scanning the first fluid flow surface portion with an imaging assembly and generating first image data of the first fluid flow surface portion with the imaging assembly, and the first fluid flow surface portion forms at least a portion of each of the one or more first apertures;

determining a first effective air flow surface area of the first fluid flow surface portion using the first image data, and the first effective air flow surface area is a first ratio of a first fluid flow area of the one or more first apertures at the first fluid flow surface portion and a first total surface area of the first fluid flow surface portion;

determining a flow-area ratio of the first fluid flow surface portion using the measured fluid flow rate and the first effective air flow surface area; and validating the fluid flow requirement for at least one second aircraft propulsion system part, at a controller, by inspecting the at least one second aircraft propulsion system part using the determined first flow-area ratio for the at least one first aircraft propulsion system part to determine an estimated fluid flow rate for the at least one second aircraft propulsion system part and executing a comparison of the estimated fluid flow rate to a design flow rate threshold range for the at least one second aircraft propulsion system part.

2. The method of claim 1, wherein each of the at least one second aircraft propulsion system part is a discrete instance of the at least one first aircraft propulsion system part.

3. The method of claim 1, wherein the at least one first aircraft propulsion system part and the at least one second aircraft propulsion system part are different parts of a same part family.

4. The method of claim 1, wherein the at least one first aircraft propulsion system part includes a plurality of first aircraft propulsion system parts, the method further comprising:

determining an average flow-area ratio using the flow-area ratio of each first aircraft propulsion system part of the plurality of first aircraft propulsion system parts, wherein validating the fluid flow requirement for the at least one second aircraft propulsion system part includes inspecting the at least one second aircraft propulsion system part using the determined average flow-area ratio for the at least one first aircraft propulsion system part to determine the estimated fluid flow rate for the at least one second aircraft propulsion system part.

5. The method of claim 1, wherein the at least one first aircraft propulsion system part includes a plurality of apertures, and the one or more first apertures are a subset plurality of the plurality of apertures.

6. The method of claim 1, wherein:

validating the fluid flow requirement for the at least one second aircraft propulsion system part includes controlling the imaging assembly at the controller to scan a second fluid flow surface portion of the at least one second aircraft propulsion system part with the imaging device, generate second image data of the second fluid flow surface portion, and determine a second effective air flow surface area of the second fluid flow surface portion using the second image data;

the second fluid flow surface portion forms at least a portion of each of one or more second apertures of the at least one second aircraft propulsion system part, and the first fluid flow surface portion and the second fluid flow surface portion are defined by a same boundary definition; and the second effective air flow surface area is a second ratio of a second fluid flow area of the one or more second apertures at the second fluid flow surface portion and a second total surface area of the second fluid flow surface portion.

7. The method of claim 1, wherein validating the fluid flow requirement for the at least one second aircraft propulsion system part includes determining the at least one second aircraft propulsion system part is acceptable or unacceptable, the at least one second aircraft propulsion system part is acceptable where the estimated fluid flow rate is within the design flow rate threshold range, and the at least one second aircraft propulsion system part is unacceptable where the estimated fluid flow rate is outside of the design flow rate threshold range.

8. The method of claim 1, performing the fluid flow test on the at least one first aircraft propulsion system part includes installing a fluid flow test assembly on the at least one first aircraft propulsion system part at the one or more first apertures, directing the fluid through the one or more first apertures with the fluid flow test assembly, and measuring the fluid flow rate of the fluid through the one or more first apertures with the fluid flow test assembly.

9. The method of claim 1, wherein the first fluid flow area is a first area of the one or more first apertures at the first fluid flow surface portion and the second fluid flow area is a second area of the one or more second apertures at the second fluid flow surface portion.

10. An assembly for validating a fluid flow requirement for at least one aircraft propulsion system part, the assembly comprising:

an imaging device; and a controller, the controller includes a processor in communication with a non-transitory memory storing instructions, which instructions when executed by the processor, cause the processor to:

scan a fluid flow surface portion of the at least one aircraft propulsion system part with the imaging device and generate image data of the fluid flow surface portion, the at least one aircraft propulsion system part includes a body and one or more apertures, the body forms the fluid flow surface portion, the body further forms an aperture inlet and an aperture outlet for each of the one or more apertures, and the fluid flow surface portion forms one or both of the aperture inlet and the aperture outlet for each of the one or more apertures;

determine an effective air flow surface area of the fluid flow surface portion using the image data, and the effective air flow surface area is a ratio of a fluid flow area of the one or more first apertures at the fluid flow surface portion and a total surface area of the fluid flow surface portion; and validate the fluid flow requirement for the at least one aircraft propulsion system part by inspecting the at least one aircraft propulsion system part using the determined effective air flow surface area and a predetermined flow-area ratio for the at least one aircraft propulsion system part to determine an estimated fluid flow rate for the at least one aircraft propulsion system part and executing a comparison of the estimated fluid flow rate to a design flow rate threshold range for the at least one aircraft propulsion system part.

11. The assembly of claim 10, wherein the imaging device is a three-dimensional (3D) scanning camera.

12. The assembly of claim 10, wherein a first aircraft propulsion system part of the at least one aircraft propulsion system part is different than a second aircraft propulsion system part of the at least one aircraft propulsion system part.

13. The assembly of claim 10, wherein the fluid flow area is an area of the one or more apertures at one or both of the aperture inlet and the aperture outlet of each of the one or more apertures.

14. The assembly of claim 10, wherein the at least one first aircraft propulsion system part includes a plurality of apertures, and the one or more apertures are a subset plurality of the plurality of apertures within the fluid flow surface portion.

15. A method for validating a fluid flow requirement for at least one aircraft propulsion system part, the method comprising:

scanning a fluid flow surface portion of the at least one aircraft propulsion system part with an imaging assembly and generating image data of the fluid flow surface portion with the imaging assembly, the at least one aircraft propulsion system part includes a body and one or more apertures, the body forms the fluid flow surface portion, the body further forms an aperture inlet and an aperture outlet for each of the one or more apertures, and the fluid flow surface portion forms one or both of the aperture inlet and the aperture outlet for each of the one or more apertures;

determining, at a controller, an effective air flow surface area of the fluid flow surface portion using the image data, and the effective air flow surface area is a ratio of a fluid flow area of the one or more first apertures at the fluid flow surface portion and a total surface area of the fluid flow surface portion, and the fluid flow area is an area of the one or more apertures at one or both of the aperture inlet and the aperture outlet of each of the one or more apertures; and validating, at the controller, the fluid flow requirement for the at least one aircraft propulsion system part by inspecting the at least one aircraft propulsion system part using the determined effective air flow surface area and a predetermined flow-area ratio for the at least one aircraft propulsion system part to determine an estimated fluid flow rate for the at least one aircraft propulsion system part and comparing the estimated fluid flow rate to a design flow rate threshold range for the at least one aircraft propulsion system part.

16. The method of claim 15, wherein validating the fluid flow requirement for the at least one aircraft propulsion system part includes determining the at least one aircraft propulsion system part is acceptable or unacceptable, the at least one aircraft propulsion system part is acceptable where the estimated fluid flow rate is within the design flow rate threshold range, and the at least one aircraft propulsion system part is unacceptable where the estimated fluid flow rate is outside of the design flow rate threshold range.

17. The method of claim 15, wherein a first aircraft propulsion system part of the at least one aircraft propulsion system part is different than a second aircraft propulsion system part of the at least one aircraft propulsion system part.

18. The method of claim 15, wherein a first aircraft propulsion system part of the at least one aircraft propulsion system part is the same as a second aircraft propulsion system part of the at least one aircraft propulsion system part.

19. The method of claim 15, wherein the fluid flow surface portion is a portion of a body surface area of the body.

20. The method of claim 15, wherein the image data is three-dimensional (3D) image data.

* * * * *